Oct. 15, 1935.  P. E. KLEINEBERG  2,017,462
BOOK TRIMMING MACHINE
Filed Jan. 13, 1932  13 Sheets-Sheet 1
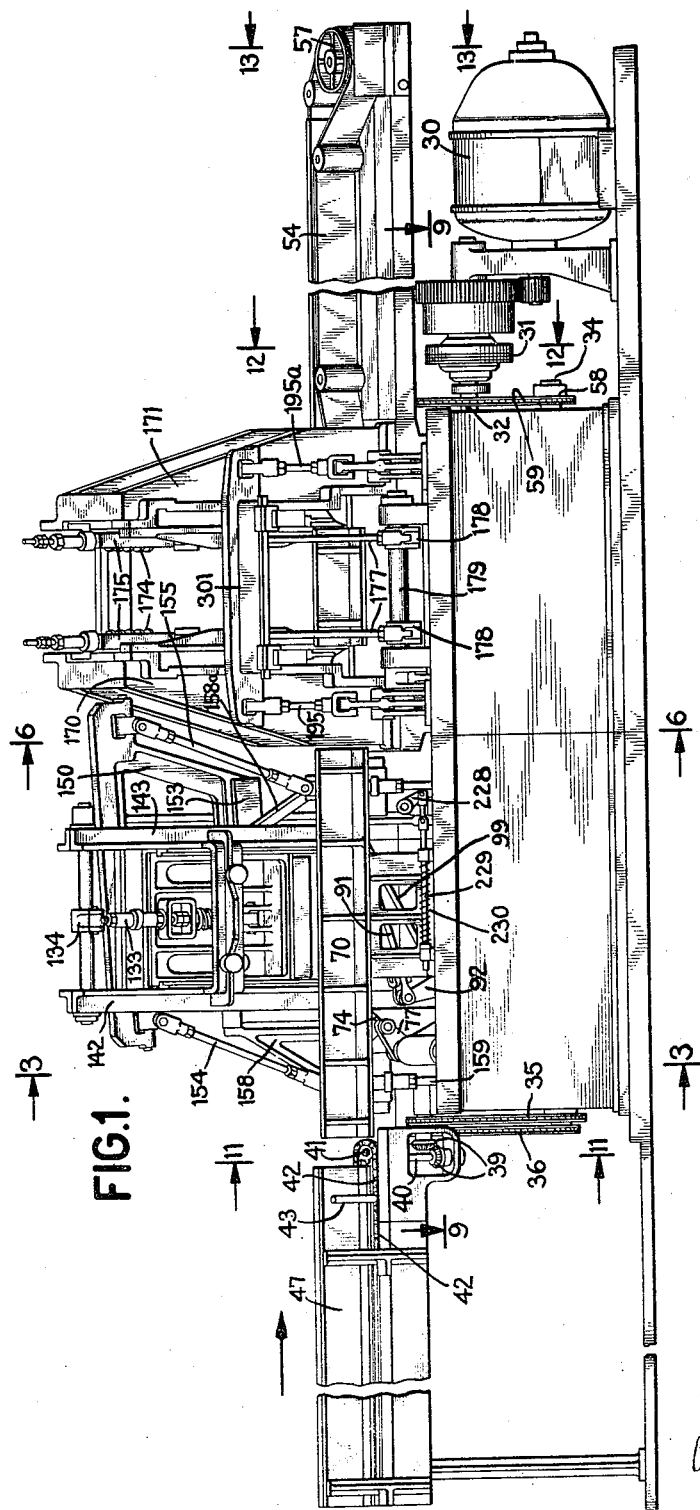
INVENTOR
Paul E. Kleineberg
BY
Cooper, Kerr & Dunham
ATTORNEY Oct. 15, 1935.  P. E. KLEINEBERG  2,017,462
BOOK TRIMMING MACHINE
Filed Jan. 13, 1932   13 Sheets-Sheet 2
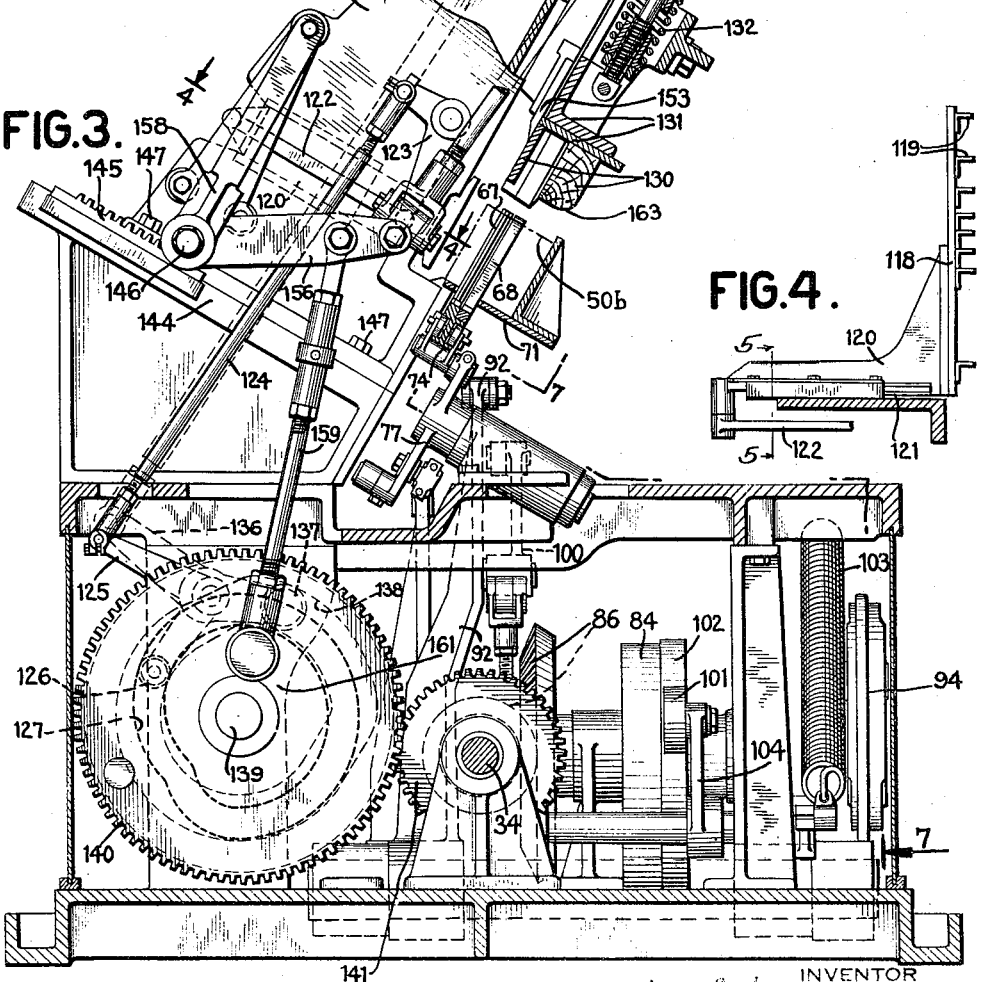

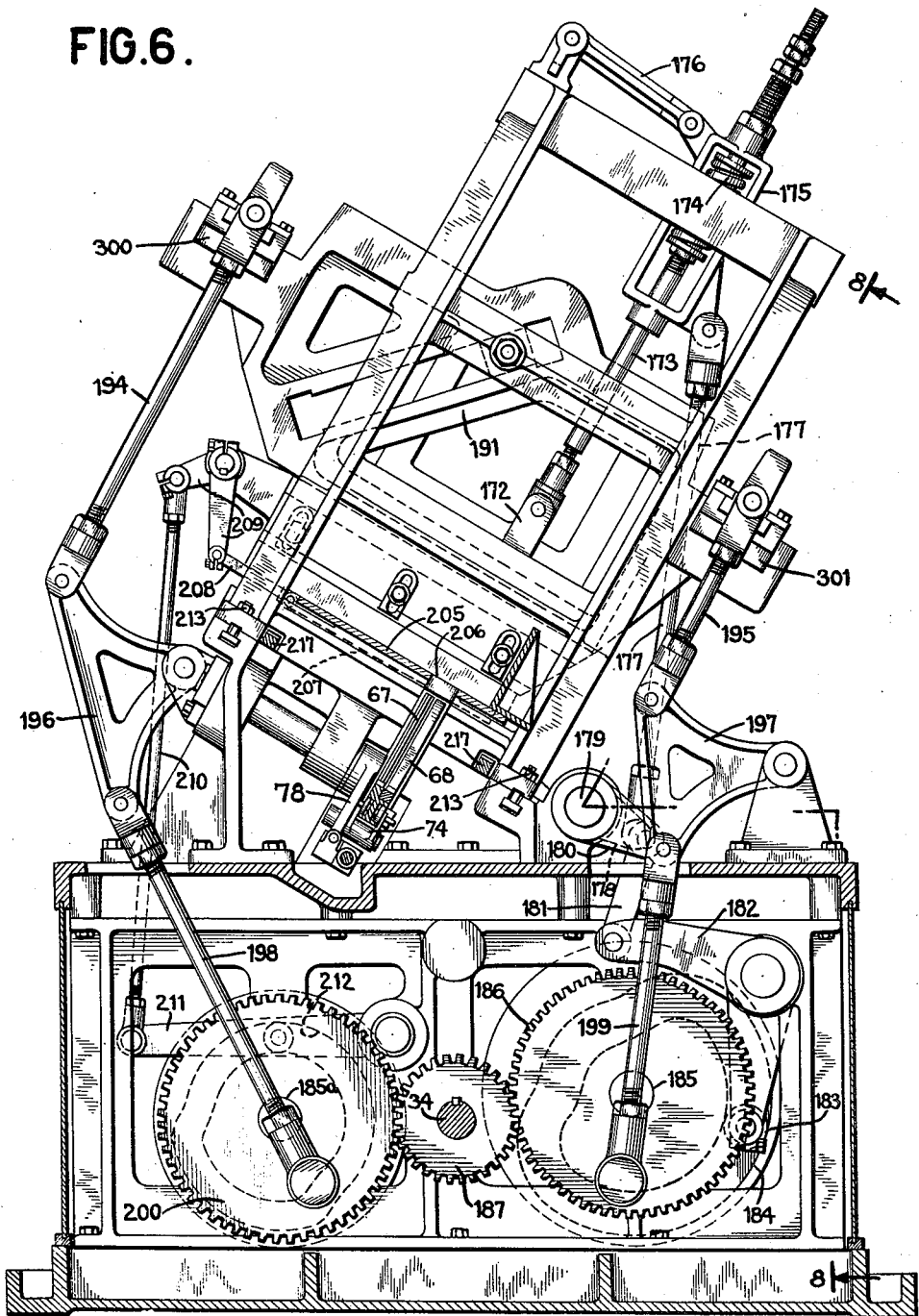

Oct. 15, 1935.   P. E. KLEINEBERG   2,017,462
BOOK TRIMMING MACHINE
Filed Jan. 13, 1932   13 Sheets-Sheet 6

INVENTOR
Paul E. Kleineberg
BY
Cooper, Kerr + Dunham
ATTORNEYS

Oct. 15, 1935.  P. E. KLEINEBERG  2,017,462
BOOK TRIMMING MACHINE
Filed Jan. 13, 1932   13 Sheets-Sheet 8

INVENTOR
Paul E. Kleineberg
BY Cooper, Kerr + Dunham
ATTORNEYS

Oct. 15, 1935. P. E. KLEINEBERG 2,017,462
BOOK TRIMMING MACHINE
Filed Jan. 13, 1932 13 Sheets—Sheet 9
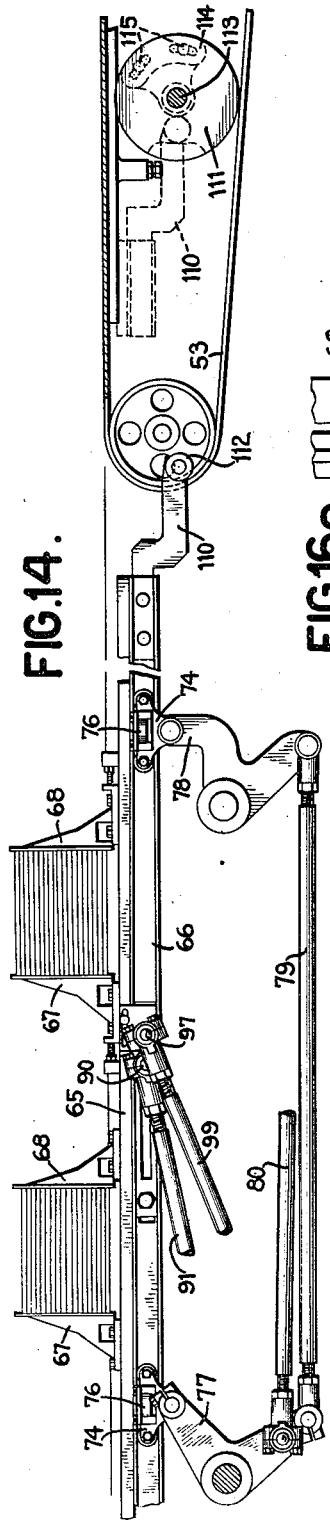
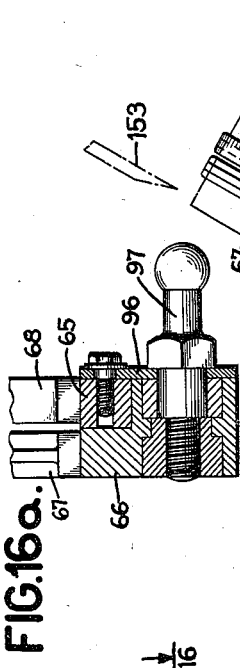
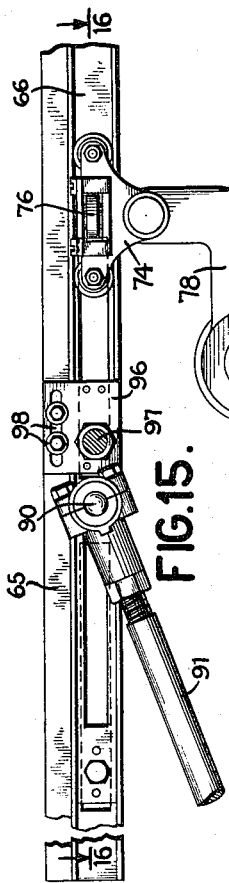
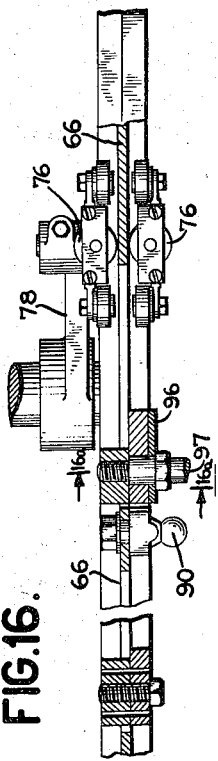
INVENTOR
Paul E. Kleineberg
BY
Cooper, Kerr & Dunham
ATTORNEY

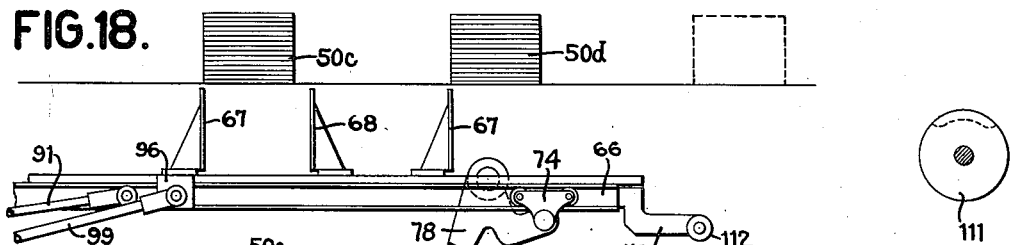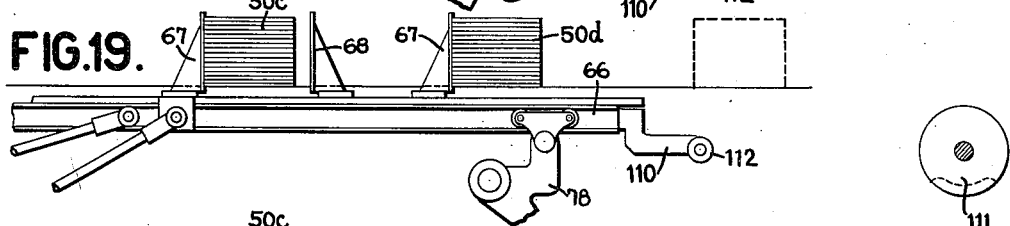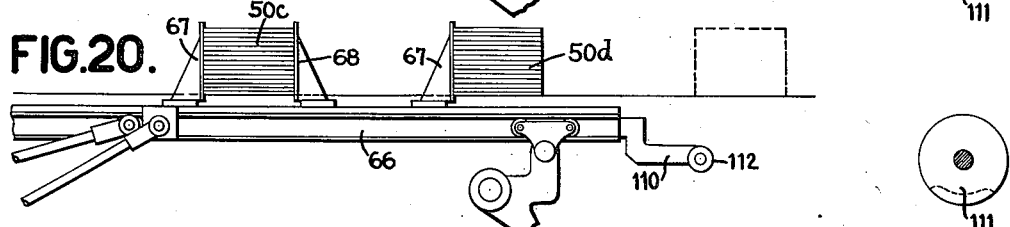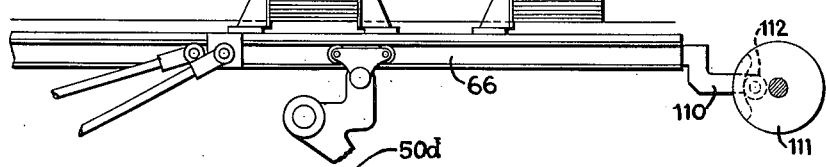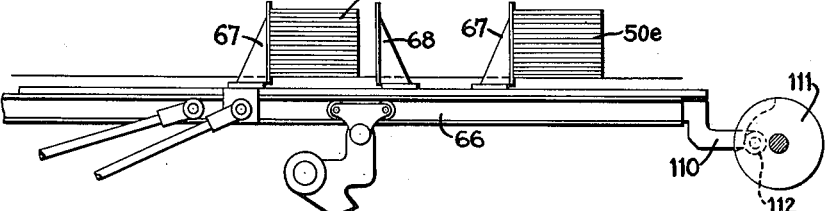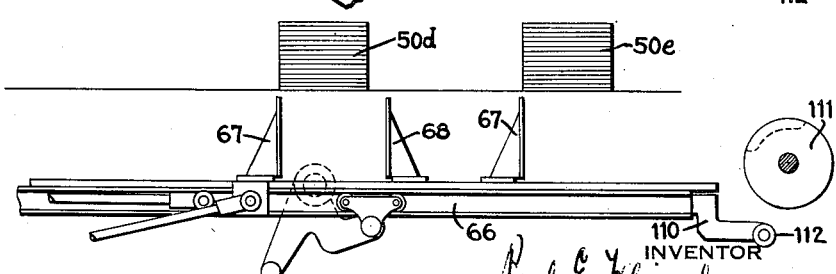

Oct. 15, 1935. P. E. KLEINEBERG 2,017,462
BOOK TRIMMING MACHINE
Filed Jan. 13, 1932 13 Sheets-Sheet 11

INVENTOR
Paul E. Kleineberg
BY
Cooper, Kerr + Dunham
ATTORNEY

Oct. 15, 1935.  P. E. KLEINEBERG  2,017,462
BOOK TRIMMING MACHINE
Filed Jan. 13, 1932  13 Sheets-Sheet 13
FIG. 29.
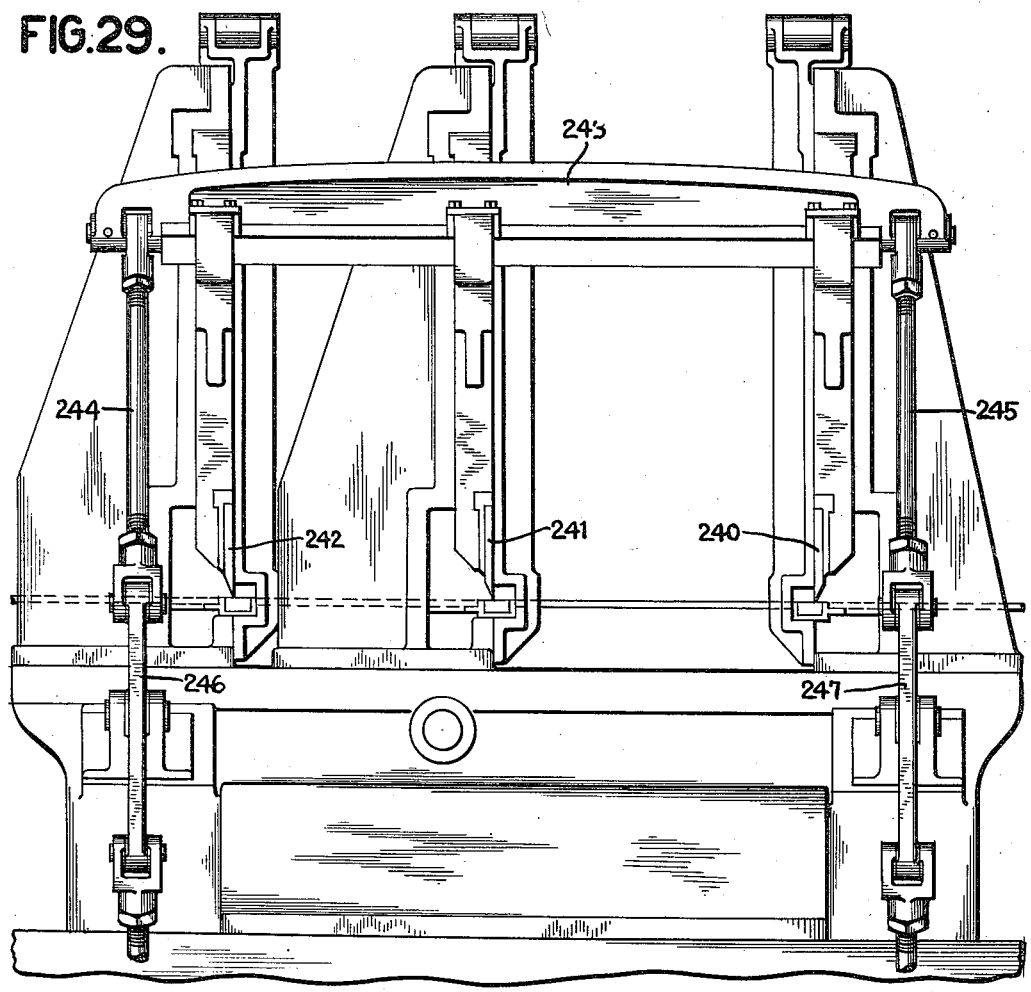
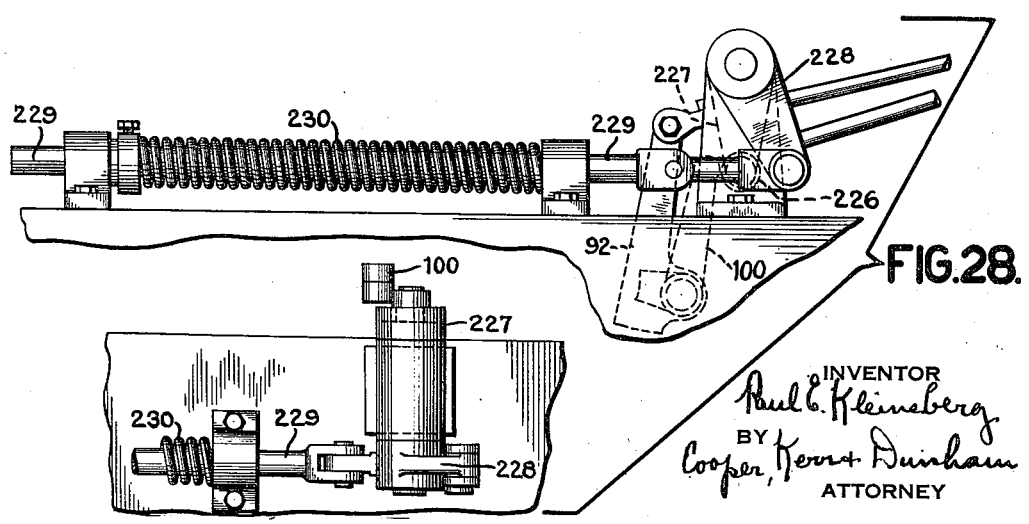
FIG. 28.
INVENTOR
Paul E. Kleineberg
BY Cooper, Kerr & Dunham
ATTORNEY Patented Oct. 15, 1935

2,017,462

UNITED STATES PATENT OFFICE 2,017,462

BOOK TRIMMING MACHINE

Paul E. Kleineberg, Easton, Pa., assignor, by mesne assignments, to T. W. & C. B. Sheridan Company, a corporation of New York Application January 13, 1932, Serial No. 586,338

18 Claims. (Cl. 164—48)

This invention relates to book trimming machines for trimming the edges of books, magazines and stacks of individual sheets of paper or of other similar material which is to be trimmed or cut into smaller sheets. Among the objects of this invention is to provide a machine of this character which is capable of rapid and accurate operation.

One object of the present invention resides in the provision of improved means for supporting books or stacks of books while the trimming operations are being performed thereon to the general end that more accurate and uniform trimming operations may be performed than heretofore.

A further object of the present invention resides in the provision of a trimming machine for books in which both vertical and lateral support is provided for a stack of books while trimming operations are being performed thereon.

A further object of the present invention resides in the provision of a tilted trough-shaped support for supporting the book stacks during trimming operations whereby both vertical and lateral support is afforded instead of mere vertical support as heretofore.

A further object of the present invention resides in the provision of an improved means for conveying the book stacks to the trimming station or stations to the general end that the book stacks may be more accurately presented to the trimming devices at the trimming station or stations.

A further object of the present invention resides in the provision of an improved book stack conveyor for a trimming machine in which conveyor provision is made for mechanically jogging or registering a stack of books before the books are trimmed at a trimming station.

Further and more detailed objects of the present invention reside in the provision of an improved conveyor for books which will permit the dispensing with the use of chain conveyor devices at positions where trimming operations are to be effected. In lieu of a chain conveyor a novel form of conveyor is provided which comprises pushing and jogging or registering fingers and means for reciprocating the same for effecting advancing operations or feed of the stacks together with means for raising and lowering the fingers and with means for causing a relative movement of approach of the registering or jogging fingers and the pushing fingers for accurately registering the book stacks which are conveyed through the machine.

A further object of the present invention resides in the provision of improved means for definitely and mechanically locating a stack of books with respect to trimming knives.

A further object of the present invention resides in the provision of jogging devices for aligning the binding or rear edges of a stack of books preparatory to trimming the longitudinal or open edges.

A further object of the present invention resides in the provision of an improved trimming machine with provisions for closing normally open slots in the cutting bed during trimming operations.

A further object resides in the provisions for enabling the adjustment of the position of the longitudinal trimming knife in respect to the guiding or back up rail of the binding edges of books and the adjustment of the spacing of the two end trimming knives.

A further object resides in providing a book trimming machine which may be adapted for trimming transverse edges of a stack of paper and for transversely cutting the stack of paper into multiple portions.

Further and other objects of the present invention will be hereinafter set forth in the accompanying specification and claims and shown in the drawings which show what I now consider to be preferred embodiments of the invention.

With these and incidental objects in view the invention consists of certain novel features of construction and combinations of parts the essential elements of which are set forth in the appended claims and preferred embodiments of which are described hereinafter with reference to the drawings which accompany and form a part of the specification.

In the drawings:

Figure 1 is a front elevational view of the machine with certain portions of the feed and delivery belts broken away;

Fig. 2 is a diagrammatic plan view of the feed section, the trimming section and the delivery section of the machine. This view is taken looking in a direction perpendicular to the feed bed of the machine, which bed is inclined to be horizontal;

Fig. 3 is a sectional view taken on line 3—3 of Fig. 1 and looking in the direction of the arrows;

Figs. 4 and 5 are detail views of certain of the parts shown on Fig. 3. These views are taken respectively on line 4—4 of Fig. 3 and on line 5

Figure 7:
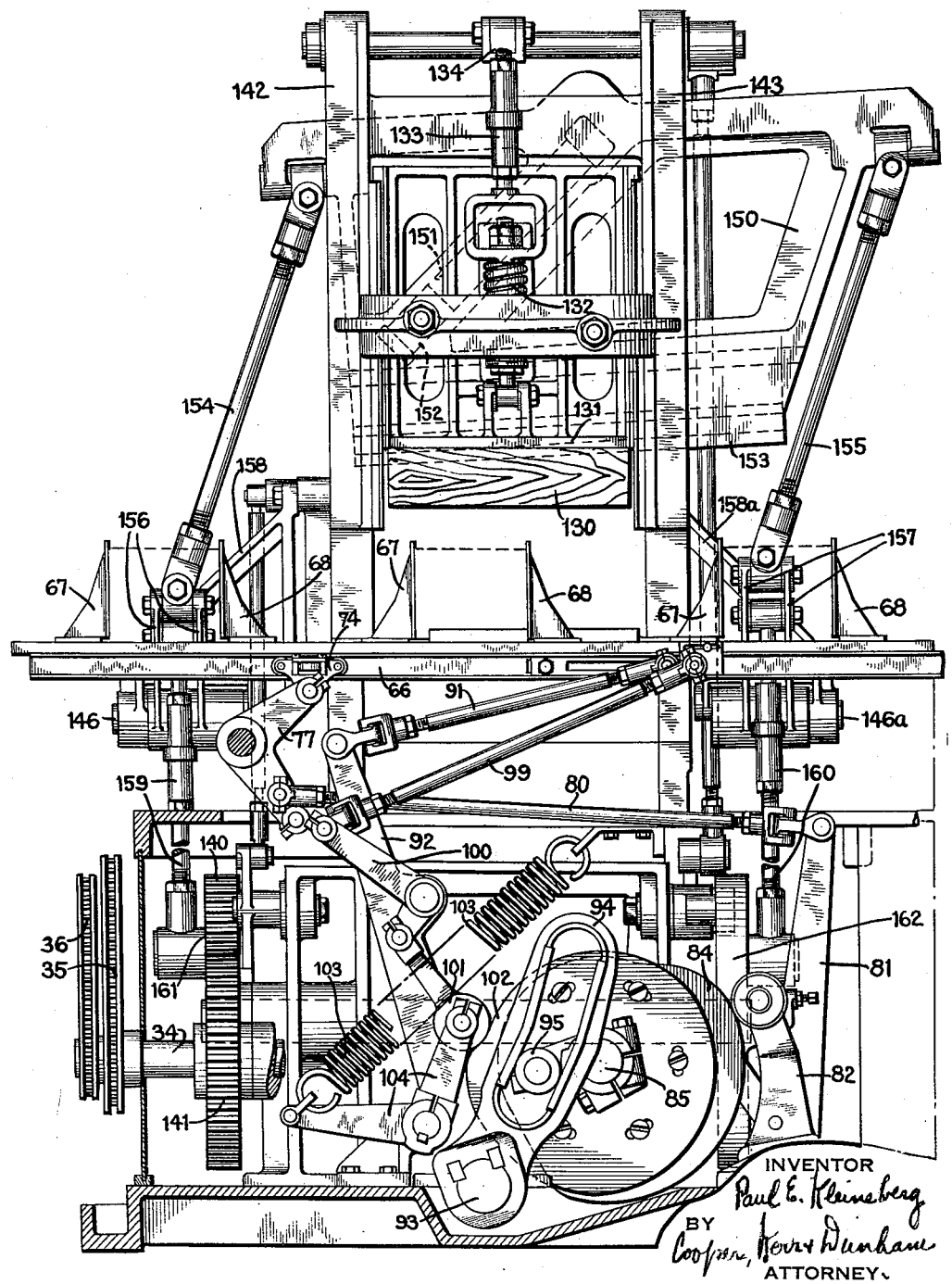
Figure 8:
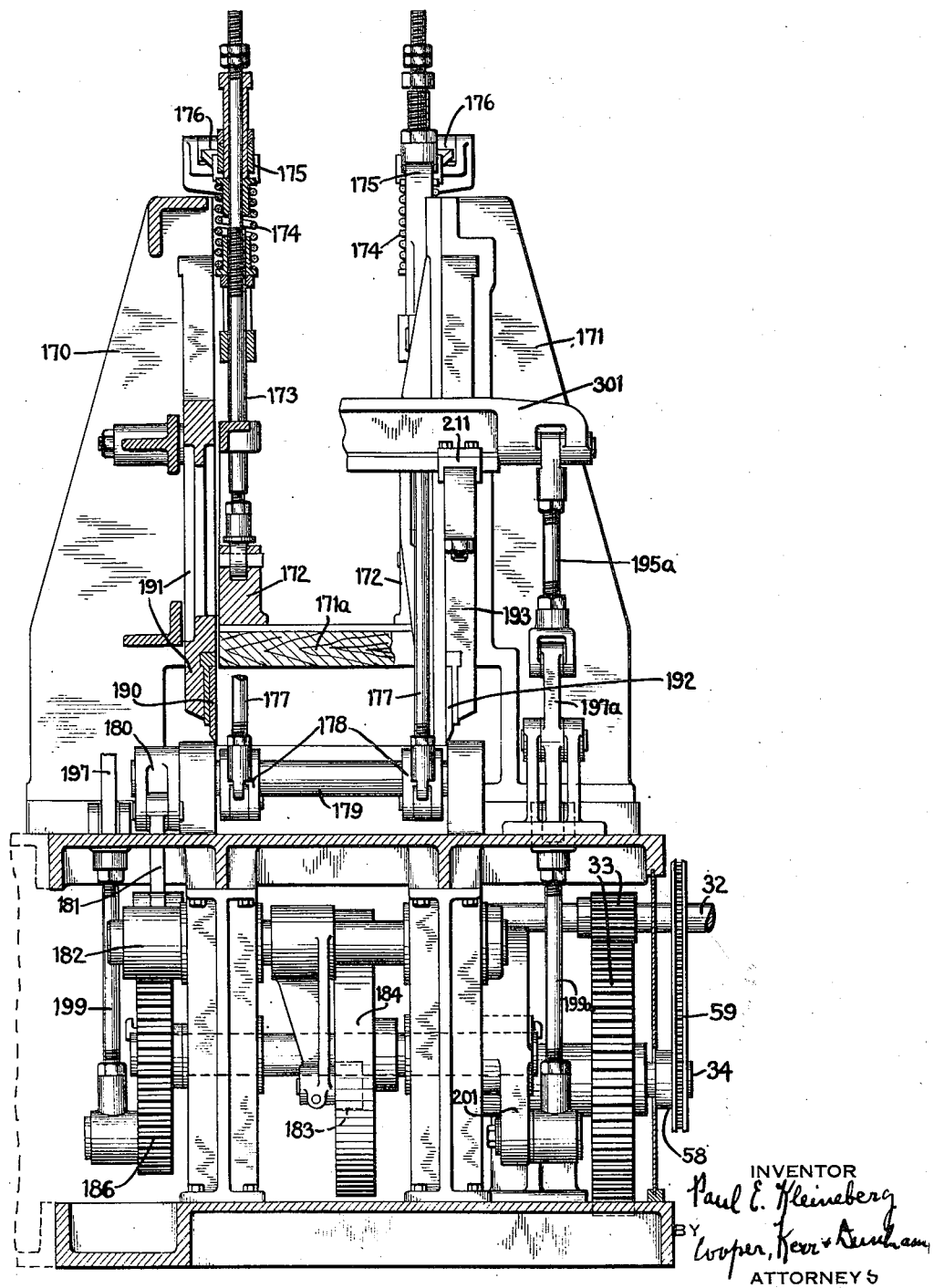
Figure 9:
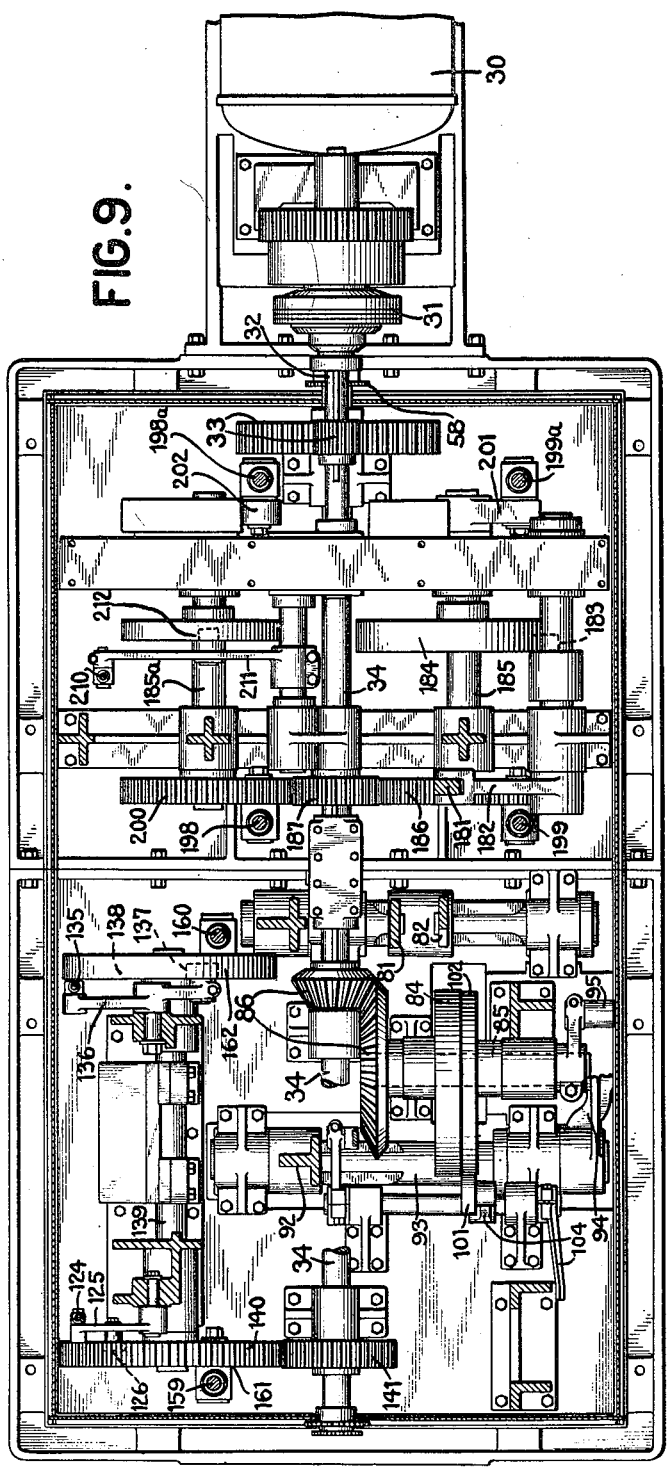
Figure 10:
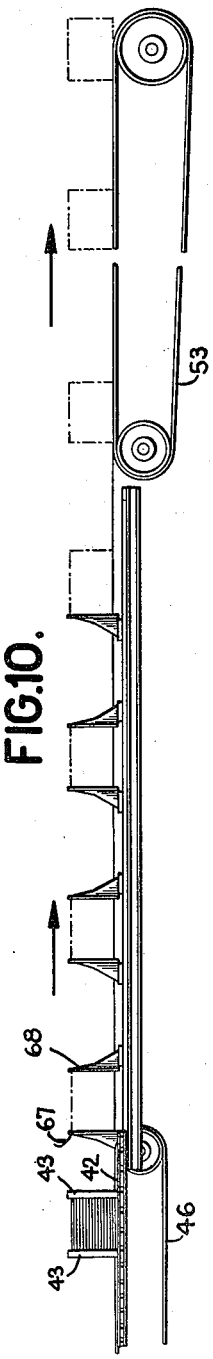
Figure 11:
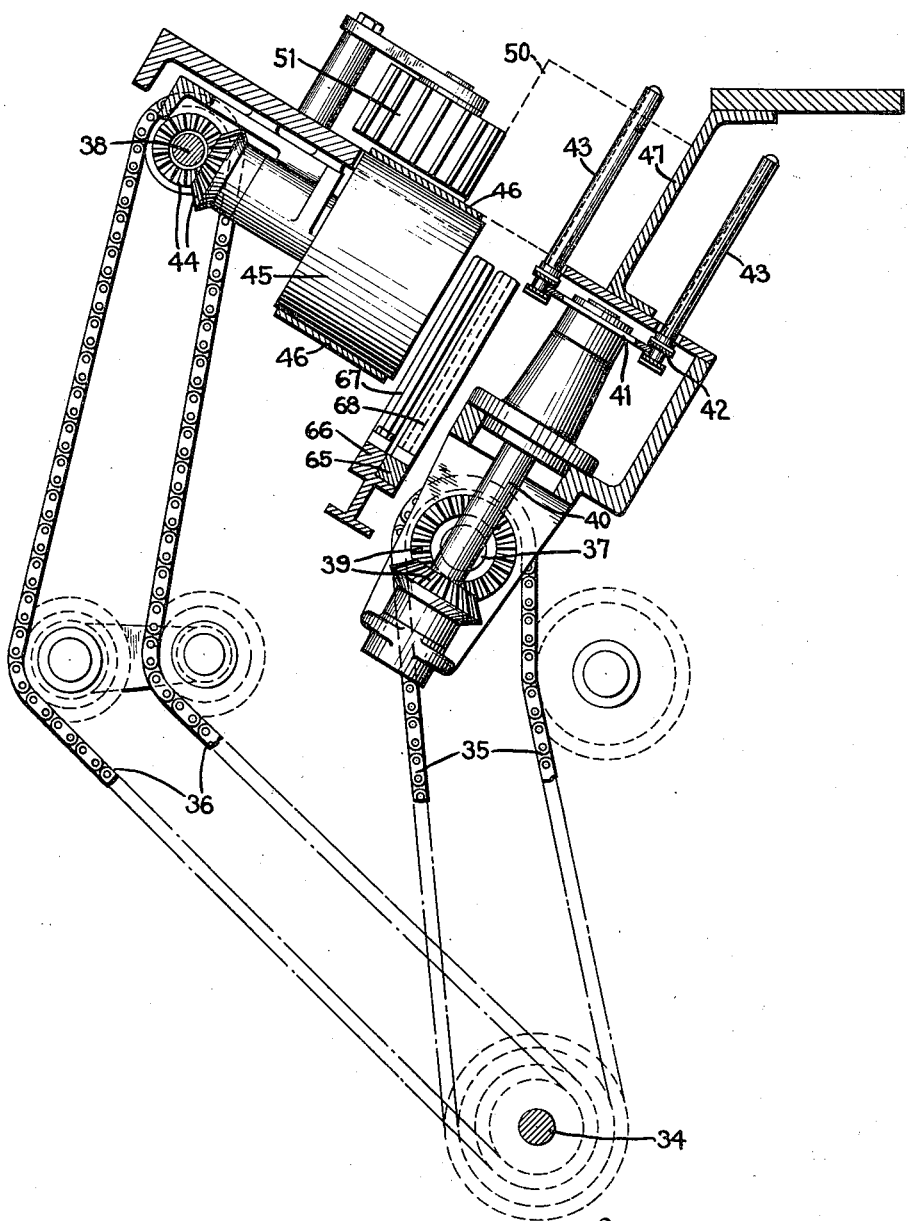
Figure 12:
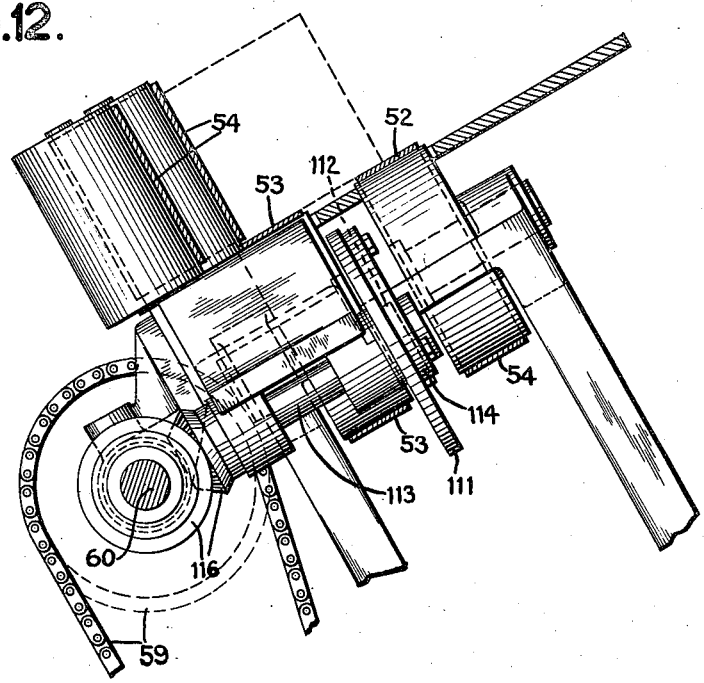
Figure 13:
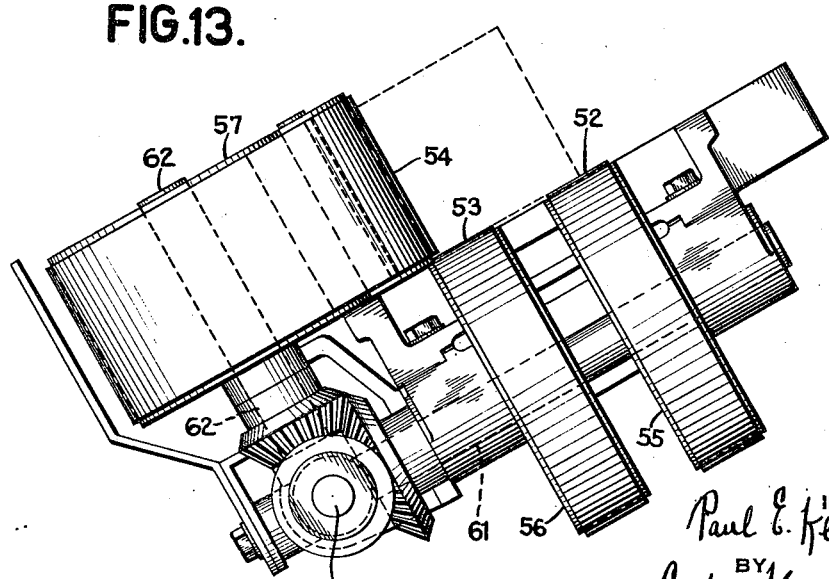
Figure 24:
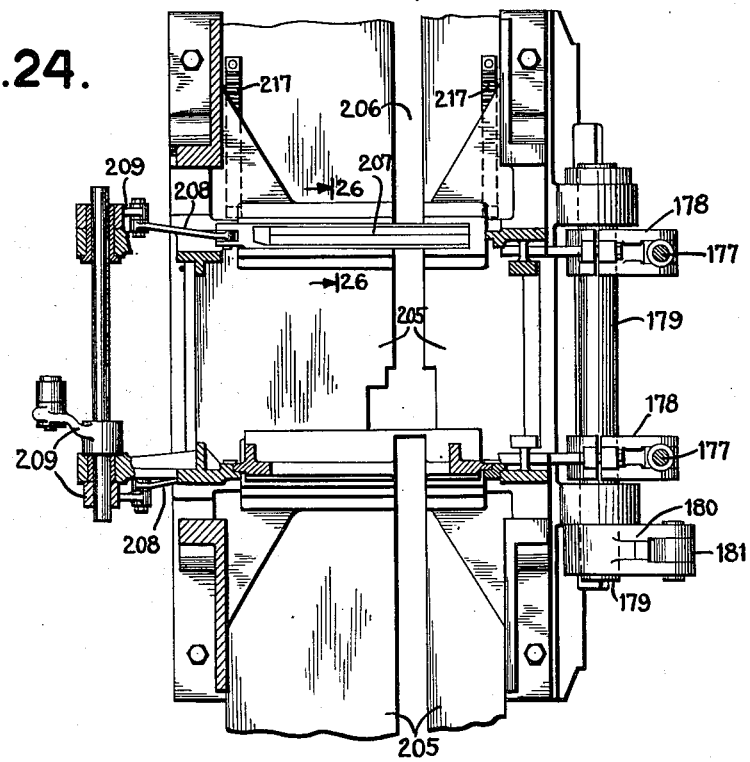
Figure 25:
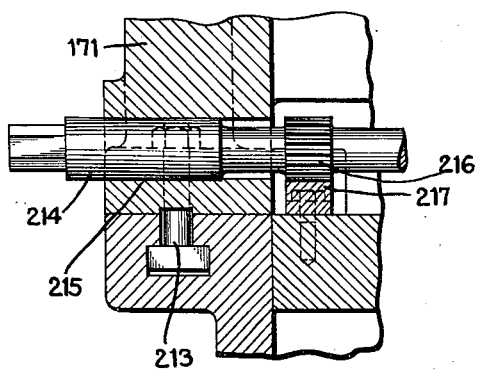
Figure 26:
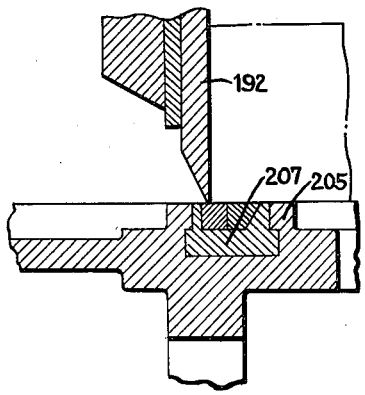
Figure 27:
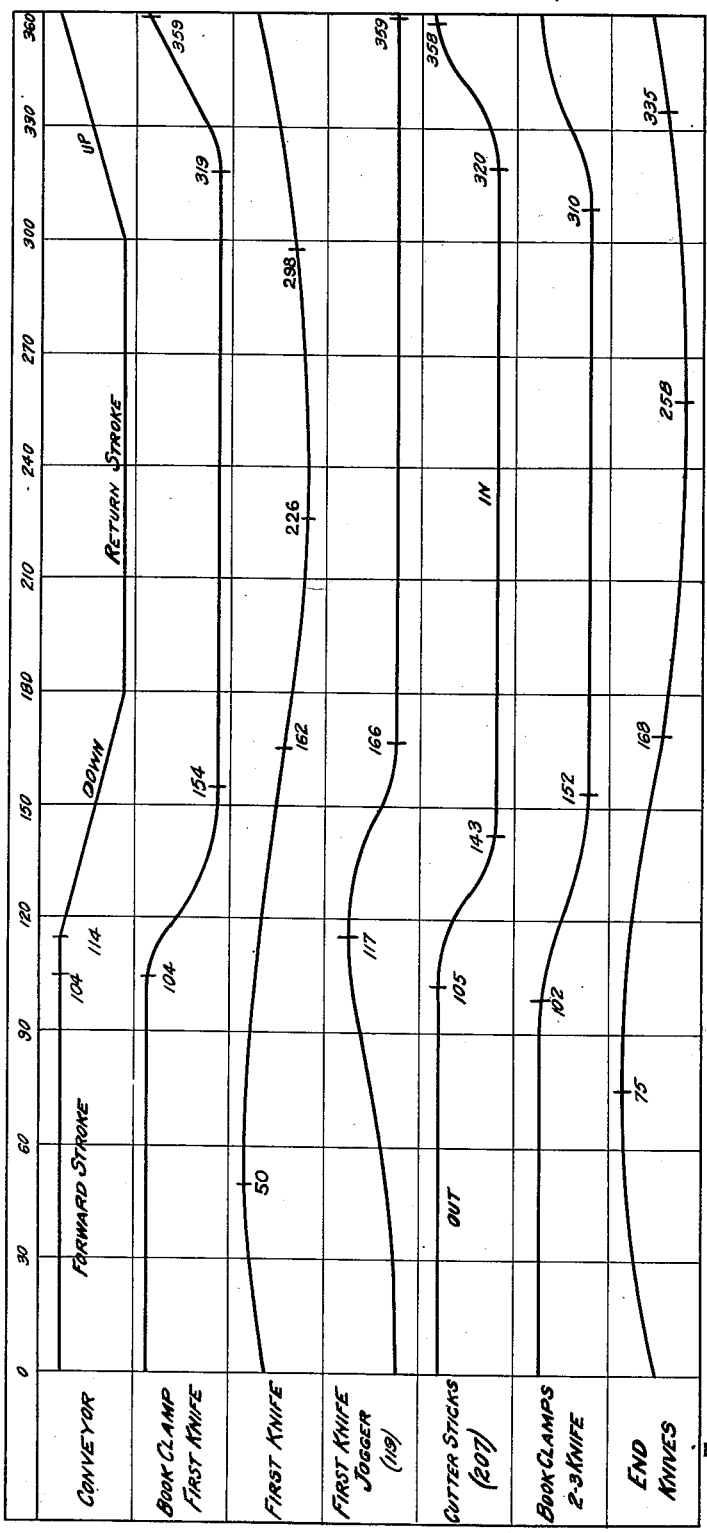

5—5 of Fig. 4, looking in the direction of the arrows;

Fig. 6 is a sectional view taken on line 6—6 of Fig. 1 and looking in the direction of the arrows;

Fig. 7 is a part sectional and part elevational view of the longitudinal cutting knife sections of the machine. The view being taken on line 7—7 of Fig. 3 and looking in the direction of the arrows;

Fig. 8 is a part sectional and a part elevational view of the trimming section of the machine. This view is taken on line 8—8 of Fig. 6 looking in the direction of the arrows;

Fig. 9 is a horizontal plan view of the drive parts which are in the base of the machine. This view is taken substantially on line 9—9 of Fig. 1 looking in the direction of the arrows;

Fig. 10 is a diagrammatic view showing a portion of the feeding section, the conveying devices for the trimming section and a portion of the delivery section of the machine in elevation. This view is taken substantially along the line 10—10 of Fig. 2 and looking in the direction of the arrows;

Fig. 11 is a sectional view taken on line 11—11 of Fig. 1 and looking in the direction of the arrows;

Fig. 12 is a sectional view of the delivery belt end of the machine, the section being taken substantially on line 12—12 of Fig. 1;

Fig. 13 is an end view of the delivery belt end of the machine, the view being taken substantially on line 13—13 of Fig. 1 and looking in the direction of the arrows;

Fig. 14 is an enlarged detail view of certain parts of the reciprocating book feeding, conveying and registering devices. The view is in enlarged detail of certain parts which are shown in Fig. 7. This view shows by dash lines a displaced position of certain of the parts;

Fig. 15 is an enlarged view of a portion of the mechanism shown in Fig. 14 with certain parts omitted;

Fig. 16 is a transverse sectional view taken substantially on line 16—16 of Fig. 15 and looking in the direction of the arrows;

Fig. 16a is a detail sectional view of certain parts shown in Fig. 16, the section being taken on line 16a—16a of Fig. 16;

Fig. 17 is an enlarged detail view of certain parts shown in smaller scale on Fig. 6;

Figs. 18 to 23 inclusive, show the stack conveying devices in various displaced positions and show the cycle of operation of these parts;

Fig. 24 is a transverse sectional view taken adjacent the transverse knife cutting station of the machine showing certain parts of the bed plates and removable blocks therein;

Fig. 25 is a detail sectional view showing the parts which are used for effecting shift of the transverse knife carrying frame;

Fig. 26 is a detail sectional view of certain parts shown in Fig. 24 taken on line 26—26 of Fig. 24;

Fig. 27 is a timing diagram of the machine;

Fig. 28 are detail views of a shock absorbing mechanism which is used to cushion the action of the conveying devices; and Fig. 29 is a view of a modified construction in which three transverse cutting knives are shown in place of two transverse cutting knives.

In general the machine comprises a feed section, an intermediate conveying and trimming section and a delivery section. The books in stacks are placed by hand on suitable belts in the feed section and are fed to the conveying section and in the conveying section they are advanced to trimming stations where trimming operations are performed. Subsequently the conveyor delivers the books to the delivery belt at the opposite end of the machine. At this point the books are removed from the machine by an operator.

Main drive

Referring to Figs. 1 and 9, the machine is driven by a main driving motor 30. This motor drives the machine through a suitable clutch generally designated 31 in Fig. 1. The clutch is shifted in or out by hand by a suitable clutch shifting control mechanism (not shown). From the clutch a drive shaft 32 extends into the base of the machine and this shaft 32 by a suitable gearing generally designated 33 (Fig. 9) drives the main drive shaft 34 which is disposed in the base of the machine.

From the drive shaft 34, drive is secured to the feed section of the machine in the following manner.

Referring to Figs. 1, 11 and 7, suitable sprockets are provided on the end of the shaft 34 and chain drives 35 and 36 drive from these sprockets to sprockets disposed respectively on shafts 37 and 38. Shaft 37 in turn through a bevel gearing 39 drives a shaft 40 which in turn drives a sprocket 41 (see Figs. 11 and 1). Sprocket 41 in turn drives a feed chain 42 which feed chain is provided with vertical posts 43. Shaft 38 (Fig. 11) through a bevel gearing 44 is adapted to drive a pulley 45 which in turn drives the feed belt 46. It will be noted that the upper reach of belt 46 is inclined to the horizontal as shown in Fig. 11 and this feed belt 46 traverses over an inclined table provided with a backing up plate 47 which is likewise inclined to the vertical. The disposition of belt 46 to the backing up plate 47 is perpendicular as shown in Fig. 11. In loading the machine, stacks of books are placed upon the belt 46 and as this belt 46 moves forward and as the chain 42 moves forward the pins or posts 43 intercept the books and in cooperation with the belt 46 carry stacks of books forward to the intermediate conveying section of the machine. It will be understood that the feed section of the machine is of considerable length and that the chain 42 is provided with a multiplicity of posts 43.

If desired, lining up devices can be provided on the feeding section of the machine for lining up the edges of the stack of books. Due to the inclined disposition of the feed table or trough the stack of books 50 (Figs. 2 and 11) tend to rest by gravity against the inclined backing up plate 47, but by providing the lining up devices the books may be forcibly pressed against the backing up plate 47. A suitable lining up device comprises a corrugated roller 51 (Fig. 11) which preferably has flutes on its periphery, and such roller is rotated by frictional contact of the edges of the book stack therewith and acts to press the stack of books down against the backing up plate 47. In stacking the books into the machine it will be understood that preferably the rear edges of the books which have the stitching and bound up edges are placed towards the backing up plate 47 and in contact with such plate.

Although the delivery of the books from the machine occurs later on after the trimming operations have been completed the delivery belt structure will now be described.

Referring to Figs. 1 and 2, the delivery belt structure may conveniently comprise three feed belts respectively designated 52, 53 and 54 (see also Figs. 12 and 13). Belts 52 and 53 are driven by suitable pulleys 55 and 56 and belt 54 is driven by a pulley 57. Pulleys 55, 56 and 57 are driven as follows: Disposed on the main drive shaft 34 in the base of the machine is a sprocket 58 (see Fig. 1). Sprocket 58 through a suitable chain and sprocket drive 59 (Fig. 12) drives a shaft 60 which shaft extends transversely along the machine and substantially parallel with the reach of belts 52, 53 and 54. At its opposite end, shaft 60 is provided with bevel gearing adapted to drive a shaft 61 which in turn drives the pulleys 55 and 56 and other portions of this bevel gearing drive a vertically inclined shaft 62 which in turn drives the pulley 57. The delivery belt is provided with the usual belt tightener but as these are of conventional construction no detailed explanation is required. It will be understood that the delivery belts are inclined in a similar manner to the feed belts and that the stacks of books are removed by hand from the delivery belts.

As is customary in machines of this general class, the trimming operations are carried out in two steps and at two separate trimming stations. At the first trimming station the longitudinal or open edge of the stack of books is trimmed. This open edge is the edge of the books opposite and parallel to the binding edge or back. After the trimming is effected at this first trimming station the stack of books is transferred over to a second trimming station and at this second trimming station trimming operations are performed upon the end edges of the stack of books. These end edges are the edges which are at right angles to the binding edge or backs. Unlike previous trimming machines the trimming operations are performed in the present machine with the stacks of books inclined to the horizontal and abutting a backing up plate by gravity. In this way errors and discrepancies in trimming are avoided. Previous trimming machines have carried the books through trimming stations by belt or chain types of conveyor mechanisms. Such chain or belt conveyors have heretofore been provided with grippers holding the books against the belts or chains and difficulty has been experienced in properly registering the books at the trimming stations due to the stretching of the conveyor belts or chains and due to other difficulties which are inherent with these types of conveyors.

With previous constructions there was a varying tension on the grippers and the bunches or stacks of books would swing thereby causing the last cuts to be out of square. Furthermore, the gripper conveyor chains and other parts ultimately become worn and such wear would cause the books to stop in varying longitudinal positions.

According to the present invention the books in contradistinction to being conveyed to and from the trimming stations by chain types of conveyors with grippers are conveyed thereto and removed therefrom by positively actuating conveying means, which conveying means are provided with devices for accurately registering the books for presentation to each trimming station. Before describing in detail the conveying mechanism, explanation will be given to the various steps of operation in connection with diagrammatic Figs. 2 and 10. In Fig. 2 reference numeral 50 designates a stack of books being moved along by the feed belt 46 and chain 42. These feeding devices and particularly the posts 43 on the chain 42 advance the stack of books from the position designated 50 in Fig. 2 to the station designated 50a. At this station, 50a, the mechanical conveying device comes into action to advance the stack of books by successive steps of movement until eventually the books are delivered to the delivery belts 52, 53 and 54. In brief the conveying devices comprise a pair of bars 65 and 66. Adjustably but rigidly attached to bars 65 and 66 and in upstanding relation therefrom (see Fig. 1) are posts or fingers 67 and 68. The set of fingers 67 are carried by the bar 66 (see Figs. 2, 14 and 17) and the set of fingers 68 are carried by the bar 65. The fingers 67 will hereafter be termed "pusher fingers" and the fingers 68 will be termed "jogging or registering fingers". In the operation of the conveying devices, the stack of books are delivered from the position marked 50 in Fig. 2 to the 50a position. After the set of books reach the 50a position, a pair of fingers 67 and 68 rise substantially vertically, 67 being in back of the stack of books and 68 being ahead of the stack of books and slightly in advance thereof. Thereafter while the 67 finger is relatively stationary, the finger 68 is caused to approach and jog the stack of books against 67. Subsequently the conveying bars 65 and 66 are displaced one station step to the right to the 50b position. This 50b station is the first trimming station at which the longitudinal edge of the books is trimmed. After being trimmed at this first trimming station the stack of books at the 50b position is released by the relative opening up of fingers 67 and 68. Thereafter the fingers descend and are displaced back to the left to a position in which they are again elevated to pick up another stack of books at 50a. This cycle is repeated, successive stacks of books being removed from station to station. It may be here explained that after leaving the first trimming station 50b the stack of books are displaced to an intermediate or idle station 50c and this displacement to this second station is effected by another set of fingers 67 and 68. After the set of books are at the station 50c they are displaced to the second trimming station 50d by another set of fingers. Registration is maintained of the stack of books at the station 50d and after the trimming is completed at this 50d station, the stack of books are removed from the 50d station by the last finger 67 which displaces the stack of books over on to the delivery belts 52, 53 and 54. These latter belts deliver the books out of the machine. At the station 50d, trimming operations are performed upon the end edges of the book stack. It will be noted that at 50d that no finger 68 is provided since for subsequent operations after trimming, registering is not required. It will be noted that there are four fingers 67 all mounted on bar 66 and three fingers 68 mounted on bar 65. The details of construction of the conveyor mechanism will now be described.

It has previously been explained that the books in the feed and delivery ends of the machine are disposed in angularly disposed troughs. The trough-like disposition of the books with the binding edges or backs abutting, one side or edge of the trough is also maintained in the conveying and trimming sections of the machine.

Referring to Fig. 3, which shows the first trimming station the trough is here shown as comprising a member 70 which is parallel to and in alignment with member 47 (Fig. 11) of the conveying section of the machine. The base portion comprises a member 71 which is also inclined and slotted to permit the fingers 67, 68 to project therethrough.

Referring to Fig. 17, the member 66 is substantially H-shaped in cross-section, it being provided with lower flanges 72 and upper flanges 73, between which roller carriages are disposed. The roller carriage is generally designated 74, and such roller carriage is provided with a number of rollers, a pair of rollers being disposed on each side of the center web of the H section 66 and these four rollers bear on the upper and lower flanges as shown. The roller carriage, in addition to having the four rollers previously described which bear on the upper flanges 73 and lower flanges 72, also is provided with a pair of rollers 76 which bear on the center web as shown on Fig. 16. As shown in Fig. 14, there are a pair of these roller carriages 74, one adjacent each end of the rail 66. The left hand carriage 74 is carried by a bell crank member 77, Fig. 14, and the right hand carriage 74 is carried on a bell crank member 78. Bell cranks 77, 78 are pivotally mounted on fixed pivots as shown and are interconnected together by a link 79. The rail 65 with its cooperating bar 66 and bell crank members 77, 78 constitute in effect a parallel motion and provide for the raising and lowering of fingers 67 and 68 while maintaining parallel relationship of said fingers 67 with respect to 68. The raising and lowering of 66 and 65 is effected by means of a link 80 which is pivotally connected with the bell crank 77 and which member 80 has its opposite end (see Fig. 7) connected to a rocker arm 81 having connected thereto a cam follower 82 cooperating with a cam 84 mounted on shaft 85. Shaft 85 (Fig. 7) is driven from the main drive shaft 34 (see Fig. 9) by bevel gearing 86 (see Figs. 9 and 3).

The registering or jogging motion of finger 68 relative to finger 67 is secured by mounting 65 so that it can be slightly shifted longitudinally with respect to 66, its carrying member and providing a cam motion for producing such relative shifting movement.

It may be explained that mechanism is provided which produces a concurrent longitudinal shift of fingers 67 and 68 and which mechanism also effects a registering or jogging movement of 68 relative to 67. The mechanism for producing the longitudinal shifting action for conveying will first be described.

Referring to Fig. 16, a crank stud 90 is mounted on member 66 and to this crank stud a connecting rod or link 91 is attached (see Figs. 14 and 7). Link 91 at its opposite end connects to a lever 92 which is fixed to a rock shaft 93, the rock shaft having also fixed to it a slotted member 94 cooperating with a crank roller 95 upon a crank which is fixed to shaft 85, previously referred to. Upon rotation of 85, 66 will be displaced to the right and/or to the left. In order to impart the supplemental registering or jogging motion of the bar 65 relative to 66 the following mechanism is provided.

Referring to Fig. 16a, 65 is adjustably secured to a member 96, which member 96 has secured to it a crank stud 97. It will be understood that 65 is relatively slidable with respect to 66, and that the position of 65 with respect to its cooperating member 96 can be relatively adjusted by reason of the cap screw and slot construction 98 (see Fig. 15). Attached to the crank stud 97 is a connecting rod or link 99 (Figs. 14 and 7) which link at its opposite end connects to a bell crank 100 (Fig. 7) the bell crank in turn being connected to a cam follower member 101 which cooperates with a cam 102 fixed to shaft 85. The cam follower 101 is urged against the cam by means of a heavy spring 103 which is fixed to one end to the frame of the machine and to the other end arms 104, one of which carries the cam follower 101. The rotation of cam 102 effects a relative shifting movement of the members 65 and 66 relative to one another and thus brings about the registering or jogging approaching movement of finger 68 relative to pusher finger 67. It will be understood that the configuration of cam 102 and of the slot in member 94 is such that the rise of cam 102 imparts an additional movement to 65 over that imparted to 66 by member 94. In this way, opening up movement of the fingers 67 and 68 relatively to each other is obtained. The closing up movement is produced by the spring 103 forcing the cam follower 101 against its cam.

The cycle of operation of the conveyor parts may best be understood by reference to Figs. 18 to 23 inclusive. In Fig. 18, 50c represents a stack of books in the supplementary or idle station intermediate the first trimming station and the second trimming station. 50d represents a stack of books at the final trimming station. As shown in Fig. 18 the fingers 67 and 68 are shown in depressed position and separated. The first step of operation is to raise these fingers 67 and 68 to the position shown in Fig. 19. The next step in the cycle of operation is to cause finger 68 to approach the right hand end of the stack 50c and jog and register the book stack. This relation of parts is shown in Fig. 20.

The next step in the cycle of operation is to displace the stack from the 50c position to the 50d position. This is done by displacing the fingers 67 and 68 to the right. This relation of the parts is shown in Fig. 21. With the parts in this position it will be noted that an extension 110 which extends out from the right of member 66 has become engaged in a box cam 111. This box cam rigidly locks 66 in position and accurately presents the stack of books 50d to the transverse cutting knives. The drive for this box cam will be subsequently described.

The next step in the cycle of operation of the conveying parts is shown in Fig. 22. In this figure the finger 68 is shown as retracted from the stack 50d preparatory to lowering the fingers 67 and 68 out of intercepting relation with the book stack. The final figure (Fig. 23) shows the fingers 67 and 68 lowered out of intercepting relation with the stack 50d and ready to be again displaced to the left back to the position in Fig. 18, at which time the cycle is repeated. It will be noted that when the parts are shifted from the Fig. 21 position to the Figs. 22 and 23 positions that the cam follower 112 on the extension 110 will have become disengaged from the box cam 111 so that the conveying devices are again free to be shifted to the left.

Referring again to Fig. 18, it will be noted that the finger 67 which is below the stack 50d, is a single finger and that there is no cooperating finger 68. Upon the elevation of this single finger 67 into intercepting position as shown in Fig. 19, the finger is adapted to operate to displace the stack to the position shown marked 50e in Fig. 21 when the conveyor parts are shifted to the right. In the 50e position the book stack is picked up by the delivery belt and carried away from the conveying section of the machine. The manner in which the box cam 111 is driven will now be described.

Referring to Fig. 14, the box cam 111 is shown as disposed on a shaft 113. A member 114 is fixed to this shaft 113 and the box cam 111 is adjustably secured to the member 114 by the studs 115 which pass through slots in member 114 and which are received by the box cam 111. This adjustment provides for accurately timing the box cam 111 with respect to shaft 113. The drive for shaft 113 is secured as follows: Referring to Fig. 12 it will be noted that shaft 60, which is driven by the chain and sprocket 59 previously referred to, is provided with bevel gearing 116 which is adapted to drive the shaft 113. 114 is secured to the shaft 113 and 114 in turn drives the cam 111 in the manner previously described. The cam follower 112 is likewise shown on Fig. 12.

It has been previously explained that the inclined trough-like disposition of the table at the trimming section of the machine provides for the pressing of the book backs by gravity against the backing up plate 70. It may be desirable, however, to provide a supplementary jogging or registering mechanism at this point to jog and register the longitudinal edges of the box and insure their definitely and uniformly abutting the backing plate. Such jogging mechanism is, however, not essential and it may be omitted in certain cases. This longitudinal jogging mechanism will now be described.

Referring to Fig. 3, the reference character 50b indicates the stack of books at the first trimming position at which the longitudinal edges of the books are trimmed. Disposed and spaced slightly from the longitudinal edge of the book stack is a transverse bar 118 (see also Figs. 4 and 5) which bar has fastened to it a number of vertical jogging fingers 119. The bar 118 is carried in a bracket 120, which bracket is slidably mounted in guideways 121 fast to the frame of the machine. For reciprocating these jogging fingers back and forth into contact with the edges of the book stack a link 122 is provided which connects to the bracket 120 and this link in turn connects to a bell crank 123, which is connected by a link 124 to a bell crank 125 having a cam follower 126 in cooperation with a suitable cam 127 in the base of the machine, which cam is driven in a manner to be subsequently described.

*Clamping devices for books at longitudinal trimming station*

At the longitudinal station 50b, suitable clamping devices are provided for tightly clamping the books against the base bed plate 71. These clamping devices comprise blocks 130 attached to a slidable head or ram generally designated 131, which head is pressed downwardly through a spring connection generally designated 132 by a push rod 133 actuated by a lever 134 connected to a link 135, which is in turn connected to a bell crank 136 having a follower 137 in cooperation with a box cam 138. The box cam 138 and the box cam 127 previously referred to are secured to a shaft 139, which shaft receives its drive from a gear 140, which in turn is driven by a gear 141 fixed on the shaft 34 previously referred to. As usual in machines of this class the clamping action precedes the actual trimming action.

At the first trimming station there is a trimming head frame which comprises a pair of upright frame members 142, 143 (see Fig. 7). These frame members are adjustably slidably mounted on the inclined frame bed plate 144 (Fig. 3). It is understood that the purpose of so slidably positioning the heads on the frame 144 is to position the knives and pressing devices properly for books of different widths. To facilitate adjusting the relatively head frame members on the frame 144, the frame 144 may be provided with racks 145 and pinion teeth may be provided on the shaft 146 cooperating with this rack so that by applying a wrench to the hexagonal shaped end of shaft 146 the frames 142, 143 may be adjusted back and forth. Subsequently these can be clamped in position by tightening cap nuts 147.

*Knife construction*

The knife is of the form usually used in machines of this class and is adapted to cut with a transverse draw cut. The knife structure comprises a knife frame 150 provided with a diagonally disposed slot 151 which receives a slide block 152 fixed to the frame of the machine. It will be understood that by drawing down on the frame 150 the frame will be transversely displaced to give the desired draw cut to the knife 153 which is adjustably mounted upon the frame 150. It will be understood that the knife frame 150 is slidably guided in the frame members 142, 143. The knife frame is drawn downwardly by means of two links 154 and 155, (Fig. 7) which links are universally connected to the frame 150 at their upper ends and which links are also universally connected at their lower ends to levers 156 and 157. 156 it will be understood is a double lever, the universal connection being between the arms of this double lever. Such lever 156 is pivotally supported on the shaft 146 previously referred to which is journalled in a casting or bracket 158 fast to the frame of the machine. The levers 157 are likewise supported on a stud 146a similarly supported in a casting 158a. Levers 156 and 157 are also universally connected to links 159 and 160 (Fig. 7, see also Fig. 3). These links at the lower ends are respectively connected to crank disks 161 and 162 which crank disks are fixed to the shaft 139 previously referred to. Upon rotation of the crank disks 161 and 162 the knife frame 150 is drawn downwardly and displaced transversely to give the desired draw cut and trim the longitudinal edge of the book stack.

Referring again to Fig. 3, it will be noted that the presser block 130 at its lower edge is slightly curved as indicated at 163. Suitable packing may be provided on the lower edge of the presser block (not shown) and this packing accordingly may have a configuration shaped to conform with the curve at the rear edge of the bunch or stack of books. To provide such curvature the block 130 may be curved as shown at 163 and it will be understood that the packing is attached to 130 and conforms with the curvature 163. By providing the curvature at this point distortion of the stack when the presser block contacts therewith is obviated. Such distortion, if not prevented, might result in uneven cutting of the books.

*Second trimming station*

After the longitudinal edges of the books have been trimmed the books are advanced to an intermediate or idle station and thence to the second trimming station at which station the end edges of the book stacks are trimmed. At such second trimming station a pair of cutting knives are provided. At the second trimming station upright frame members 170 and 171 are provided (see Fig. 8). The presser construction is substantially similar to that previously described for the first trimming station. There is a presser block 171a. A double ram construction is employed and similar reference characters will be given to similar parts on these separate rams. The ram member is designated 172 and each ram is actuated through a rod 173 through a yielding spring connection 174 and the spring is compressed by a member 175 (Fig. 6) which is suitably guided in the head of the machine and also guided by link 176. The member 175, for each ram is drawn downward by a link 177, which links 177 (see Figs. 8 and 6) are connected to bell crank members 178 mounted upon a rock shaft 179. The rock shaft 179 is in turn operated by a bell crank 180 having a link 181 connected thereto, which link in turn connects to a bell crank 182 having a cam follower 183 in cooperation with a box cam 184. Box cam 184 is fixed to a shaft 185 which shaft is driven from the main drive shaft 34 by the gear 186 which meshes with a gear 187 on the main drive shaft 34.

At the second trimming station a pair of transverse trimming knives are provided which are operated by mechanism about to be described. One knife 190 is adjustably carried on a knife frame 191 and the other knife 192 is adjustably carried upon a similar knife frame 193. Knife frames 191 and 193 are guided in the manner previously described for the longitudinal knife for transverse cutting and slicing movement.

The manner of securing downward movement of the knife frames 191 and 193 will now be described. Spanning the two frames 191 and 193 are two cross members 300 and 301. To one end of one cross member 300 there is pivotally connected a link 194 and to the other cross member there is pivotally connected a link 195. These links 194 and 195 in turn connect to rock levers 196 and 197 which are suitably journalled for rocking movement on the frame of the machine. Attached to the rock levers 195 and 196 are connecting rods 198 and 199, which connecting rods at their lower ends respectively connect to crank pins disposed on spur gears 200 and 186. The other ends of the cross members 300 and 301 are similarly operated except that the lower connecting rods 198a and 199a instead of cooperating with crank pins on gears cooperate with crank pins on cranks such as 201 and 202 (Fig. 9). These cranks it will be understood are on shafts 185 and 185a.

As shown in Fig. 6, the lower bed 205 is provided with the slot 206 through which the pusher fingers 67 and 68 must project during feeding action. On cutting action provision must be made for filling up this slot because otherwise the books on being trimmed would bulge down into the open slot below the knife. Accordingly, filler or stick members 207 are provided, which filler members are slidably guided in the bed 205 in the plane of the knives. These filler members at their rear ends connect with links 208 which in turn connect with bell cranks 209. These bell cranks in turn are connected by links 210 to cam follower members 211 cooperating with the cam 212 disposed on shaft 185a. At the proper time in the operation of the machine the filler members 207 are projected forward to fill up the slots 206 and allow cutting to take place with the books properly backed up below the cutting knife. Then before reciprocating movement of the fingers 67 and 68 occurs the filler members 207 are retracted to open up the slots 206.

Adjustment of knife spacing for different lengths of books

Provision is made in the present machine for increasing the spacing between knives 190 and 192 (Fig. 8). For this purpose the frame 171 is slidably shiftable with reference to the bed frame of the machine and furthermore in order to provide for such shifting while maintaining undisturbed the operating connection for the knives, the knife frames 191 and 193 have their operating connections to the links 194 and 194a and 195 and 195a through the cross bars 300 and 301 (see Fig. 1), which knife frames are adapted to be slidably adjusted in the cross bars 300 and 301 when changes of knife spacing are to be made. Such sliding adjustment is shown at 211 in Fig. 8. When one of the frames, for example 171 is to be adjusted for a different knife spacing, the holding down fastening bolts such as 213 (Fig. 6) are loosened, thereafter a shaft 214 (Fig. 25) is inserted through a hole 215 in one of the frame members such as 171, until the pinion on the shaft 214 engages a rack 217 fixed to the base of the machine. Thereafter the shaft 214 can be turned by applying a wrench to the square end thereof and in this way the knife guiding frame 171 can be shifted relatively to the base of the machine. Following this the bolts 213 are re-tightened and the parts are again tightened up at 211 (Fig. 8). It will be understood that the bolts at 211 are loosened before this adjustment of knife spacing is made.

Referring to Fig. 28 there is shown a mechanism which has the purpose of exerting additional pressure on the jogging fingers of the conveyor devices. This mechanism is to apply additional spring pressure when the arm 92 swings in a clockwise direction to about its limit of movement. With this construction a boss on member 100 intercepts a roller 226 carried by a bell crank 227 and rocks this bell crank in an anti-clockwise direction causing bell crank 228 to be likewise rocked in an anti-clockwise direction to draw to the right a rod 229 which is provided with an extra compression spring 230.

In the modification Fig. 29, I have shown a trimming unit which can be used in lieu of the transverse trimming unit previously described. This modified form of trimmer is provided with three transverse cutting knives 240, 241 and 242 in lieu of two transverse knives 190 and 192 as in the other embodiment. These knives 240, 241 and 242 are similarly operated and adjustably mounted and their use enables edge trimming operations to be performed as before and also enable center cuts to be made in sheets of paper circulars and the like. The three knives 240, 241 and 242 are actuated by cross bar 243 which is similar to the cross bar 300 at the back of the machine as shown in Fig. 6. This cross bar is actuated by a pair of rods 244, 245 which have their lower ends pivotally connected with levers 246, 247 which are similar to levers 196 (Fig. 6). Since the remaining portion and devices of the unit having three transverse knives are similar to those which have previously been described in reference to the unit illustrated in Figs. 6 and 8 it will not be necessary to describe them here. The portion of the transverse cutting unit having three knives is similar to the operation of the aforesaid unit having two transverse knives for trimming end edges of books.

Where the multiple trimmer is employed for making center cuts a pair of knives provide the usual edge trim. Thereafter the conveyor comes into action and shifts the stack with its trimmed edges to another position in which the third knife may sever the papers into two portions.

I claim:

1. In a book trimming machine, the combination of a longitudinal table for supporting a succession of stacks of books, and having an upstanding longitudinal guide or wall at one side against which the back edges of the stacked books may abut during travel, and means for advancing the stacks longitudinally from station to station while resting on said table in abutting contact with said guide, trimming mechanisms disposed at different stations, one of said trimming mechanisms having a longitudinal knife for trimming the front edges of the stacked books, and another of said trimming mehanisms having one or two transverse knives for trimming an end edge or edges of the stacked books.

2. In a book trimming machine, the combination of a longitudinal table for supporting a succession of stacks of books, and having an upstanding longitudinal guide or wall at one side against which the back edges of the stacked books may abut during travel, said table being inclined downwardly transversely toward said guide and said guide standing perpendicular to said table, the two forming a trough for the book stacks, means for advancing the stacks longitudinally from station to station while resting on said table in contact with said guide, trimming mechanisms disposed at different stations, one of said trimming mechanisms having a longitudinal knife for trimming the front edges of the books, and another of said trimming mechanisms having one or two transverse knives for trimming an end edge or edges of the books.

3. In a book trimming machine, the combination of a longitudinal table for supporting a succession of stacks of books, and having an upstanding longitudinal guide or wall at one side against which the back edges of the stacked books may abut during travel, said table being inclined downwardly tranversely toward said guide and said guide standing perpendicular to said table, the two forming a trough for the book stacks, means for advancing the stacks longitudinally from station to station while resting on said table in contact with said guide, and means for trimming one or more edges of each book stack at one or more stations other than the longitudinal back edge abutting said guide.

4. A book trimming machine as in claim 3 and wherein is a device operating to jog the books of each stack transversely into abutting contact with the side guide wall before the operation of the trimming means.

5. A book trimming machine as in claim 1 and wherein is a device operating to aline the stacked books into contact with the side guide wall before the longitudinal trimming operation, and means operating to aline the stacked books into longitudinal alinement before the transverse trimming operation.

6. In a book trimming machine, a longitudinal table, transversely inclined, for supporting a succession of stacks of books, and a side guide wall upstanding at right angles to the lower side of said table, said table and wall forming a trough for the longitudinal travel of the stacks with the book back edges abutting said wall, conveyor mechanism for advancing the stacks along such trough from infeed to discharge, and mechanism for trimming each book stack in such trough.

7. In a book trimming machine, the combination of a longitudinal table for supporting a succession of stacks of books, means for intermittently advancing the stacks longitudinally from station to station while resting on said table, trimming mechanisms disposed at different stations, one of said trimming mechanisms having a longitudinal knife for trimming the front edges of the books, and another of said trimming mechanisms having a transverse knife for trimming an end edge of the books, and means operative at each of such trimming stations for effecting superposed alinement of the books in each stack prior to the trimming at such station; such alinement effecting means comprising a finger upstanding in a plane at right angles to the table with means operating it to move longitudinally against the stack for alining the books therein and to retract before the trimming operation.

8. In a book trimming machine, the combination of a longitudinal table for supporting a succession of stacks of books, means for intermittently advancing the stacks longitudinally from station to station while resting on said table, trimming mechanisms disposed at different stations, one of said trimming mechanisms having a longitudinal knife for trimming the front edges of the books, and another of said trimming mechanisms having a transverse knife for trimming an end edge of the books, and means operative at each of such trimming stations for effecting superposed alinement of the books in each stack prior to the trimming at such station; the stack advancing means comprising a pushing finger upstanding in a vertical plane and adapted to contact all the books in the stack while pushing them advancingly along the table, and the alinement effecting means comprising a jogging finger also upstanding in a vertical plane, and operating to contact all the books in the stack in opposition to the pushing finger, with actuating means for moving the jogging finger relatively toward and from the pushing finger.

9. In a book trimming machine, the combination of a longitudinal table for supporting a succession of stacks of books, means for intermittently advancing the stacks longitudinally from station to station while resting on said table, trimming mechanisms disposed at different stations, one of said trimming mechanisms having a longitudinal knife for trimming the front edges of the books, and another of said trimming mechanisms having a transverse knife for trimming an end edge of the books, and means operative at each of such trimming stations for effecting superposed alinement of the books in each stack prior to the trimming at such station; the stack advancing means comprising a pushing finger upstanding in a vertical plane and adapted to contact all the books in the stack while pushing them advancingly along the table, and the alinement effecting means comprising a jogging finger also upstanding in a vertical plane, and operating to contact all the books in the stack in opposition to the pushing finger, with actuating means for moving the jogging finger relatively toward and from the pushing finger, and thereafter retracting both fingers downwardly, shifting them backwardly, and elevating them for the next advancing and jogging operations.

10. In a book trimming machine, the combination of a longitudinal table for supporting a succession of stacks of books, means for intermittently advancing the stacks longitudinally from station to station while resting on said table, and for alining the books therein, comprising a pushing finger and an alining finger, each adapted to contact all the books in the stack, a longitudinal pusher bar from which the pushing finger stands in a vertical plane, a longitudinal aliner bar from which the alining finger stands in a vertical plane, and mechanism for operating the two bars to descend to lower the fingers out of the path of the stacks, and then to retract longitudinally, and then to rise to lift the fingers to position with the next stack between them, and then relatively to approach and to advance so as to aline the books and advance the stack.

11. A book trimming machine as in claim 10 and wherein is a supplemental means operative at each station for accurately determining the stopping position of the pushing finger and thereby the position of the stack relatively to the trimming means.

12. A conveyor for a book trimming machine comprising, in combination with a laterally inclined conveyor table for stacks of books, relatively movable bars, pushing fingers mounted in upstanding position on one of said bars and complementary jogging fingers mounted in upstanding position on the other of said bars, each of said pushing and jogging fingers having a straight edge of the full height of the stack of books and adapted to contact and act upon all of the books in each stack, means for relatively moving said bars and the fingers carried thereby toward and away from each other for gripping, jogging and releasing the stacks of books, means for reciprocating said bars and fingers betwen stations, and means for raising and lowering said bars and fingers between advancing and returning movements thereof.

13. A trimming machine having a cutting knife, a slotted cutting bed through which article conveying devices are adapted to project and to move along, and replaceable means for providing a filling for the portions of said slots under the cutting knife when trimming operations are to be performed.

14. A trimming machine comprising in combination, a continuous feeding mechanism, a continuous delivery mechanism, an intermittent step by step reciprocating conveying mechanism intermediate the aforesaid continuous mechanism for successively positioning stacks of material to be trimmed at one or more trimming stations.

15. In a trimming machine for books, stacks of paper and like articles, the combination of a longitudinal table for supporting a succession of stacks of articles to be advanced beneath trimming means, and longitudinally reciprocating means for advancing the stacks longitudinally step by step from station to station upon said table, comprising an upstanding member or finger adapted to contact behind each stack and a cooperating member adapted to contact afront each stack, the two to enclose the stack between them, and actuating means for the two members causing them to advance the stack from station to station, to release it, to retract out of the stack path, to retract longitudinally and to return into the stack path for the next advance, and for relatively operating the two members to engage and aline the articles in each stack before the trimming operation and disengage the same before retraction.

16. A trimming machine as in claim 15 and wherein is a supplemental means for accurately positioning each stack in relation to the trimming means before the disengagement and retraction of the members of the stack advancing means.

17. A book trimming machine including in combination a plurality of trimming stations with means for advancing books from station to station, including a reciprocating step-by-step feeding mechanism, means for jogging a stack of material as an incident to the feed of said stack of material from station to station; and supplemental means for definitely and accurately alining a stack at a determined point while the said stack is under the control of the reciprocating feeding mechanism.

18. Mechanism for intermittently advancing a stack of books or like articles comprising an inclined support for the stack, a pair of movable bars positioned beneath the support and each bar being provided with a series of fixedly attached fingers, the fingers on one bar being interspaced with relation to the fingers on the other bar to constitute oppositely disposed gripping members, each adapted to engage and aline the books in the stack, and means for moving said bars in advancing and retracting directions, to initially effect a grip of the stack and alining of the books therein, and then a subsequent transfer and release of the same and a final return of the parts to their starting position.

PAUL E. KLEINEBERG.